(12) United States Patent
Kawaguchi et al.

(10) Patent No.: US 11,211,882 B2
(45) Date of Patent: Dec. 28, 2021

(54) THYRISTOR STARTER (71) Applicant: TOSHIBA MITSUBISHI-ELECTRIC INDUSTRIAL SYSTEMS CORPORATION, Chuo-ku (JP)

(72) Inventors: Hironori Kawaguchi, Chuo-ku (JP); Akinobu Ando, Chuo-ku (JP); Hiroshi Ogino, Chuo-ku (JP); Yasuaki Matsumoto, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 4 days.

(21) Appl. No.: 16/623,905

(22) PCT Filed: Jun. 21, 2017

(86) PCT No.: PCT/JP2017/022845
§ 371 (c)(1),
(2) Date: Dec. 18, 2019

(87) PCT Pub. No.: WO2018/235190
PCT Pub. Date: Dec. 27, 2018

(65) Prior Publication Data
US 2021/0152104 A1 May 20, 2021

(51) Int. Cl.
*H02P 1/16* (2006.01)
*H02M 5/45* (2006.01)
(Continued)

(52) U.S. Cl.
CPC ............ *H02P 1/16* (2013.01); *H02M 5/4505* (2013.01); *H02P 23/14* (2013.01); *H02P 25/022* (2013.01); *H02P 27/06* (2013.01)

(58) Field of Classification Search
CPC ........ H02M 5/4505; H02P 1/52; H02P 27/06; H02P 1/46; H02P 7/293; H02P 23/00; H02P 25/022; H02P 13/14; H02P 1/16
See application file for complete search history.

(56) References Cited

U.S. PATENT DOCUMENTS 4,240,020 A * 12/1980 Okuyama ............... H02P 25/03
318/721
4,682,094 A    7/1987 Kuroiwa
(Continued)

FOREIGN PATENT DOCUMENTS

JP         61-62388 A       3/1986
WO    WO 2014/033849 A1    3/2014

OTHER PUBLICATIONS

Extended European Search Report dated Dec. 1, 2020 in corresponding European Patent Application No. 17914666.7 citing documents AA, AO and AX therein, 11 pages.
(Continued)

*Primary Examiner* — Rina I Duda
(74) *Attorney, Agent, or Firm* — Oblon, McClelland, Maier & Neustadt, L.L.P.

(57) ABSTRACT

A thyristor starter accelerates a synchronous machine from a stop state to a predetermined rotation speed by sequentially performing a first mode of performing commutation of an inverter by intermittently setting DC output current of a converter to zero and a second mode of performing commutation of the inverter by induced voltage of the synchronous machine. In the thyristor starter, during a first time period from start of performance of the second mode to arrival of the induced voltage of the synchronous machine at a first voltage value, a phase control angle of the inverter is changed such that a value thereof becomes larger as a rotation speed of the synchronous machine becomes higher.

6 Claims, 9 Drawing Sheets

(51) Int. Cl.
    *H02P 23/14*     (2006.01)
    *H02P 25/022*     (2016.01)
    *H02P 27/06*     (2006.01)

(56) References Cited

U.S. PATENT DOCUMENTS

| | | | | |
|---|---|---|---|---|
| 7,368,890 | B2 * | 5/2008 | Pande | H02P 1/029 318/700 |
| 8,519,656 | B2 * | 8/2013 | Tamai | H02P 1/46 318/400.33 |
| 8,531,144 | B2 * | 9/2013 | Tamai | H02P 6/182 318/400.33 |
| 8,772,466 | B2 * | 7/2014 | Nelson | C12N 15/8222 536/24.1 |
| 8,872,466 | B2 * | 10/2014 | Tamai | H02P 1/52 318/721 |
| 2015/0236622 | A1 * | 8/2015 | Ogino | H02P 1/46 318/400.11 |
| 2015/0365020 | A1 * | 12/2015 | Ogino | H02M 1/36 318/400.21 |

OTHER PUBLICATIONS

Zdenek Caha, "Electric Drives", (with Partial English Translation), Jan. 1, 1990, Prague, pp. 321-322; figures 115, 283, 293, 19 pages, URL: https://katalog.svkos.cz/publish/00009/MVK01_000092764MVK01.html, (Nov. 20, 2020).
International Search Report dated Aug. 29, 2017 in PCT/JP2017/022845 filed on Jun. 21, 2017.

* cited by examiner

THYRISTOR STARTER

TECHNICAL FIELD

The present invention relates to a thyristor starter.

BACKGROUND ART

Thyristor starters have been developed for starting synchronous machines such as generators and motors (for example, see WO2014/033849 (PTL 1)). A thyristor starter includes a converter that converts AC power into DC power, a DC reactor that smoothes DC power, and an inverter that converts DC power applied from the converter through the DC reactor into AC power with a variable frequency to supply the AC power to a synchronous machine. The AC power supplied to the synchronous machine is controlled whereby the synchronous machine in a stop state can be started and driven at a predetermined rotation speed.

CITATION LIST

Patent Literature

PTL 1: WO2014/033849

SUMMARY OF INVENTION

Technical Problem

In the thyristor starter described above, the inverter has at least six thyristors. The inverter can supply three-phase AC power to the synchronous machine to increase the rotation speed of the synchronous machine, by firing six thyristors two by two in order in synchronization with rotation of the synchronous machine.

However, when a short-circuit failure occurs in any of six thyristors during commutation operation of the inverter, another sound thyristor is fired, whereby a path is formed through which fault current flows through this thyristor. Consequently, components such as sound thyristors and armature windings are damaged by fault current. The larger the fault current is, the greater the damage on the components is, and the possibility that the components are damaged becomes higher.

The present invention has been made in order to solve the problem above, and an object of the present invention is to provide a thyristor starter capable of suppressing damage by fault current.

Solution to Problem

According to an aspect of the present invention, a thyristor starter that starts a synchronous machine includes a converter, a DC reactor, an inverter, and a controller. The converter converts AC power into DC power. The DC reactor smoothes the DC power. The inverter converts the DC power applied from the converter through the DC reactor into AC power with a variable frequency and supplies the AC power to the synchronous machine. The controller controls a firing phase of a thyristor in the inverter. The thyristor starter accelerates the synchronous machine from a stop state to a predetermined rotation speed by sequentially performing a first mode of performing commutation of the inverter by intermittently setting DC output current of the converter to zero and a second mode of performing commutation of the inverter by induced voltage of the synchronous machine. During a first time period from start of performance of the second mode to arrival of the induced voltage at a first voltage value, a phase control angle of the inverter is changed such that a value thereof becomes larger as a rotation speed of the synchronous machine becomes higher.

Advantageous Effects of Invention

The present invention can provide a thyristor starter capable of suppressing damage by fault current.

DESCRIPTION OF EMBODIMENTS

Embodiments of the present invention will be described in detail below with reference to the drawings. The same or corresponding parts are denoted by the same reference signs and a description thereof will not be repeated.

Figure 1:
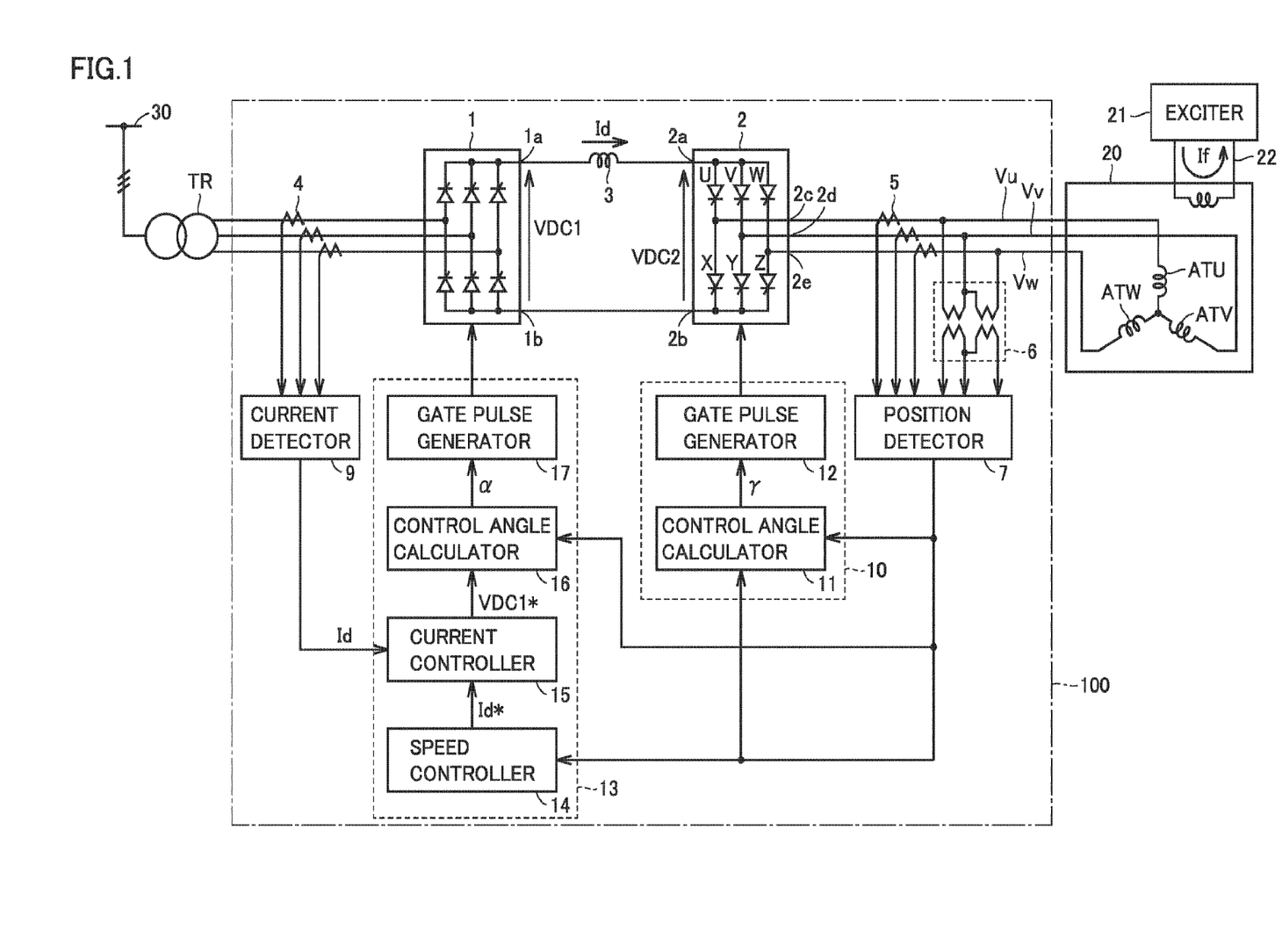
FIG. 1 is a circuit block diagram showing a configuration of a thyristor starter according to an embodiment of the present invention.

FIG. 1 is a circuit block diagram showing a configuration of a thyristor starter according to an embodiment of the present invention. Referring to FIG. 1, a thyristor starter 100 according to the embodiment of the present invention starts a synchronous machine 20 by accelerating the stopped synchronous machine 20 to a predetermined rotation speed.

Synchronous machine 20 includes a stator having armature windings ATU, ATV, and ATW and a rotor having a field winding 22. Synchronous machine 20 is coupled to, for example, a gas turbine of a thermal power plant and is rotatably driven by the gas turbine. In the following description, a predetermined rotation speed may be referred to as "rated rotation speed". For example, when the frequency of an AC power supply 30 is 60 Hz, the rated rotation speed is set to 3600 rpm.

Thyristor starter 100 is connected to the secondary side of a transformer TR. The primary side of transformer TR is connected to AC power supply 30. Transformer TR converts three-phase AC voltage supplied from AC power supply 30 into three-phase AC voltage having a predetermined voltage value and applies the three-phase AC voltage to thyristor starter 100.

Thyristor starter 100 includes a converter 1, a DC reactor 3, an inverter 2, and an exciter 21. Converter 1 is a three-phase full-wave rectifier including at least six thyristors and converts three-phase AC power from transformer TR into DC power with a variable voltage.

DC reactor 3 is connected between positive-side output terminal 1a of converter 1 and positive-side input terminal 2a of inverter 2. DC reactor 3 smoothes DC output current Id from converter 1. Negative-side output terminal 1b of converter 1 and negative-side input terminal 2b of inverter 2 are connected to each other. Another DC reactor 3 may be connected between negative-side output terminal 1b of converter 1 and negative-side input terminal 2b of inverter 2.

Three output terminals 2c, 2d, and 2e of inverter 2 are connected to three armature windings ATU, ATV, and ATW, respectively, of synchronous machine 20. Inverter 2 is a three-phase external-commutated inverter including at least six thyristors U, V, W, X, Y, and Z. Inverter 2 converts the DC power applied from converter 1 through DC reactor 3 into AC power with a variable frequency and supplies the AC power to synchronous machine 20.

Exciter 21 supplies field current If to field winding 22 of synchronous machine 20. When the AC power is supplied from inverter 2 to armature windings ATU, ATV, and ATW, with field current If being supplied to field winding 22, rotation of synchronous machine 20 is accelerated.

Thyristor starter 100 further includes current transformers 4 and 5, a voltage detector 6, a position detector 7, a current detector 9, an inverter controller 10, and a converter controller 13.

Current transformer 4 detects three-phase AC current flowing from transformer TR to converter 1 and applies a signal indicating the detected value to current detector 9. Current detector 9 calculates DC current Id output from converter 1, based on a signal from current transformer 4, and applies a signal indicating the calculated value to converter controller 13. Specifically, current detector 9 has a full-wave rectifying diode rectifier and converts the detected three-phase AC current into DC current Id.

Current transformer 5 detects current flowing from inverter 2 to armature windings ATU, ATV, and ATW of synchronous machine 20 and applies a signal indicating the detected value to position detector 7.

Voltage detector 6 detects instantaneous values of three-phase AC voltages Vu, Vv, and Vw supplied to synchronous machine 20 from inverter 2 and applies a signal indicating the detected values to position detector 7. Specifically, voltage detector 6 detects two line voltages of line voltages of three-phase AC voltages in armature windings ATU, ATV, and ATW of synchronous machine 20 (in FIG. 1, AC voltage Vu-v between the U phase and the V phase and AC voltage Vv-w between the V phase and the W phase). In this way, AC voltages of the U phase, the V phase, and the W phase can be obtained through calculation by detecting at least two line voltages of AC voltage Vu-v between the U phase and the V phase, AC voltage Vv-w between the V phase and the W phase, and AC voltage Vw-u between the W phase and the U phase. This conversion from line voltage to phase voltage is performed in voltage detector 6 or position detector 7.

Position detector 7 detects the position of the rotor of synchronous machine 20 based on signals from current transformer 5 and voltage detector 6 and applies a signal indicating the detected value to inverter controller 10 and converter controller 13.

Inverter controller 10 controls a firing phase of inverter 2 based on a signal from position detector 7. Specifically, inverter controller 10 includes a control angle calculator 11 and a gate pulse generator 12.

Control angle calculator 11 calculates a phase control angle (firing angle) γ based on the detected position of the rotor of synchronous machine 20 and applies the calculated phase control angle γ to gate pulse generator 12. Specifically, when control angle calculator 11 calculates a rotation speed of synchronous machine 20 based on a signal from position detector 7, control angle calculator 11 sets phase control angle γ based on the calculated rotation speed. Control angle calculator 11 may calculate the rotation speed of synchronous machine 20 based on a signal from voltage detector 6 instead of position detector 7.

Gate pulse generator 12 generates a gate pulse (firing command) to be applied to the gates of the thyristors of inverter 2, based on phase control angle γ received from control angle calculator 11. Inverter controller 10 corresponds to an embodiment of "controller".

Converter controller 13 controls a firing phase of converter 1, based on a signal from position detector 7 and a signal from current detector 9. Specifically, converter controller 13 controls a firing phase of converter 1 such that DC current Id output from converter 1 matches current command value Id*.

Converter controller 13 includes a speed controller 14, a current controller 15, a control angle calculator 16, and a gate pulse generator 17. Speed controller 14 calculates the rotation speed of synchronous machine 20, based on the detected position of the rotor of synchronous machine 20. Speed controller 14 generates current command value Id*, which is a target value of DC current Id, based on the calculated rotation speed.

Current controller 15 calculates a deviation ΔId between current command value Id* and DC current Id and generates a voltage command value VDC1* based on the calculated deviation ΔId. Specifically, current controller 15 includes a proportional element (P), an integral element (I), and an adder. The proportional element multiplies deviation ΔId by a predetermined proportional gain for output to the adder, and the integral element integrates deviation ΔId by a predetermined integral gain for output to the adder. The adder adds the outputs from the proportional element and the integral element to generate voltage command value VDC1*. Voltage command value VDC1* corresponds to a control command that defines DC voltage VDC1 to be output by converter 1.

Converter 1 performs control such that DC voltage VDC1 is greater than DC voltage VDC2 on the input terminal side of inverter 2 by the amount of voltage drop by DC reactor 3. DC current Id is thus controlled.

Control angle calculator 16 calculates phase control angle α based on voltage command value VDC1* applied from current controller 15. Control angle calculator 16 applies the calculated phase control angle α to gate pulse generator 17.

Gate pulse generator 17 generates a gate pulse (firing command) to be applied to the gates of the thyristors of converter 1, based on phase control angle α received from control angle calculator 16. The switching of converter 1 is controlled in accordance with the gate pulse generated by gate pulse generator 17, whereby DC current Id in accordance with current command value Id* is output from converter 1.

Figure 2:
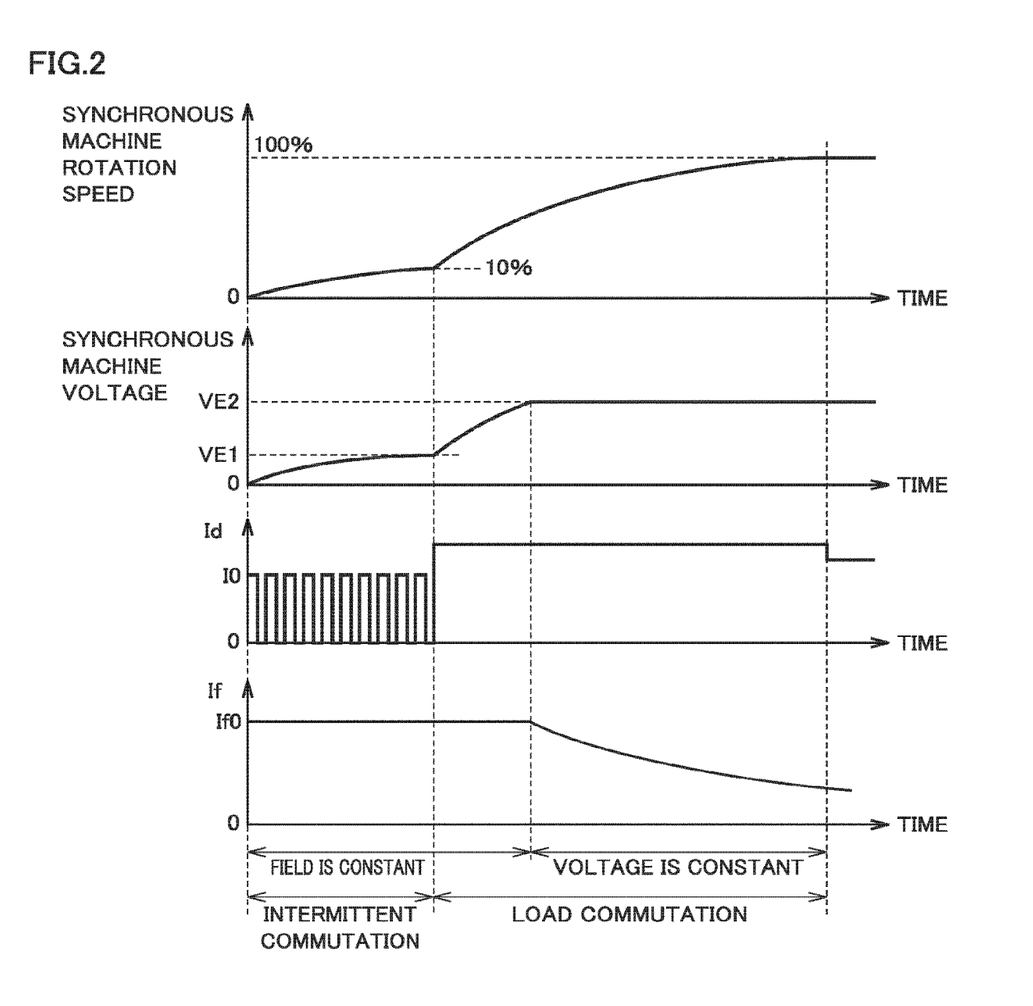
FIG. 2 is a time chart showing the basic operation of the thyristor starter.

Referring now to FIG. 2, the basic operation of thyristor starter 100 will be described.

FIG. 2 is a time chart showing the basic operation of thyristor starter 100. FIG. 2 shows the rotation speed of synchronous machine 20, an effective value of induced voltage produced in synchronous machine 20, DC current Id output from converter 1, and field current If.

In thyristor starter 100, commutation of the thyristors in inverter 2 is performed using the induced voltage produced in armature windings ATU, ATV, and ATW of synchronous machine 20. Such commutation is called "load commutation".

However, when the rotation speed of synchronous machine 20 is low, that is, at startup or at a low speed of synchronous machine 20, the induced voltage produced in armature windings ATU, ATV, and ATW is low and therefore commutation of the thyristors may fail. For this reason, when the rotation speed of synchronous machine 20 is low, "intermittent commutation" is employed in which commutation of inverter 2 is performed by intermittently setting DC output current Id of converter 1 to zero.

As shown in FIG. 2, thyristor starter 100 sequentially switches and performs the intermittent commutation mode (first mode) and the load commutation mode (second mode) so that synchronous machine 20 is accelerated from a stop state to the rated rotation speed.

Specifically, at time t=0, synchronous machine 20 in a stop state is started, and then thyristor starter 100 performs the intermittent commutation mode. In the intermittent commutation mode, DC current Id exhibits a pulse waveform. The peak value of each pulse is usually set to a constant value (Id=I0). The peak value is set, for example, such that the integrated value of AC power supplied to synchronous machine 20 during the intermittent commutation mode satisfies the amount of electric power for accelerating synchronous machine 20 in a stop state to the switching rotation speed.

Then, when the rotation speed of synchronous machine 20 reaches about 10% of the rated rotation speed, thyristor starter 100 switches from the intermittent commutation mode to the load commutation mode. In the following description, the rotation speed at which the intermittent commutation mode switches to the load commutation mode may be referred to as "switching rotation speed". In the example in FIG. 2, the switching rotation speed is about 10% of the rated rotation speed.

When synchronous machine 20 in a stop state is started at time t=0, exciter 21 supplies constant field current If to field winding 22 (If=If0). Constant field current If causes a constant field magnetic flux to be produced in the rotor. Synchronous machine 20 is accelerated in this state, and thus, the magnitude (effective value) of the induced voltage produced in synchronous machine 20 changes proportionally to the rotation speed of synchronous machine 20.

When the effective value of the induced voltage produced in synchronous machine 20 arrives at a predetermined voltage VE2, exciter 21 decreases field current If supplied to field winding 22. As a result, the effective value of the induced voltage is kept at constant voltage VE2 even when the rotation speed changes.

Figure 3:
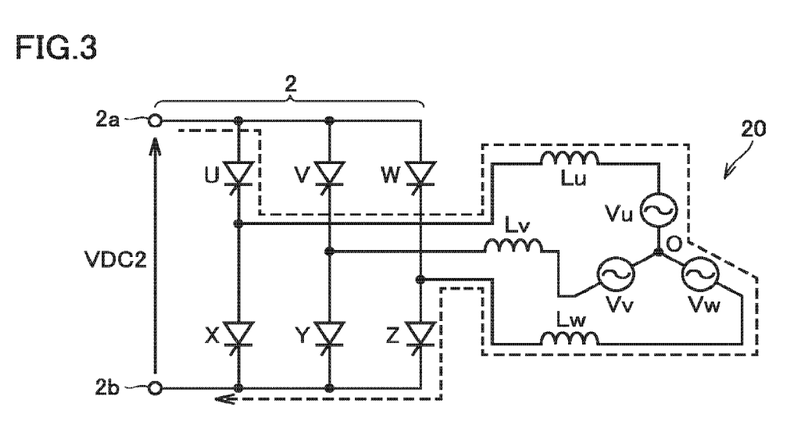
FIG. 3 is a circuit diagram showing the configuration and operation of the inverter shown in FIG. 1.

FIG. 3 is a circuit diagram showing the configuration and the operation of inverter 2 shown in FIG. 1. Referring to FIG. 3, thyristors U, V, and W have anodes connected together to positive-side input terminal 2a and cathodes connected to output terminals 2c, 2d, and 2e, respectively. Thyristors X, Y, and Z have anodes connected to output terminals 2c, 2d, and 2e, respectively, and cathodes connected together to negative-side input terminal 2b.

One of thyristors U, V, and W and one of thyristors X, Y, and Z are conducting in synchronous with three-phase AC voltages Vu, Vv, and Vw, whereby inverter 2 converts DC power supplied from converter 1 through DC reactor 3 into three-phase AC power with a variable frequency and a variable voltage and applies the converted AC power to the stator (armature windings ATU, ATV, and ATW) of synchronous machine 20. This can increase the rotation speed of synchronous machine 20.

For example, as shown in FIG. 3, when thyristors U and Z are conducting, U-phase voltage Vu of synchronous machine 20 appears at input terminal 2a of inverter 2 through inductance Lu and thyristor U, and W-phase voltage Vw appears at input terminal 2b of inverter 2 through inductance Lw and thyristor Z. That is, AC voltage Vw-u between the W phase and the U phase of synchronous machine 20 appears as DC voltage VDC2 between input terminals 2a and 2b. Reactors Lu, Lv, and Lw represent inductances of armature windings ATU, ATV, and ATW, respectively, of synchronous machine 20.

Figure 4:
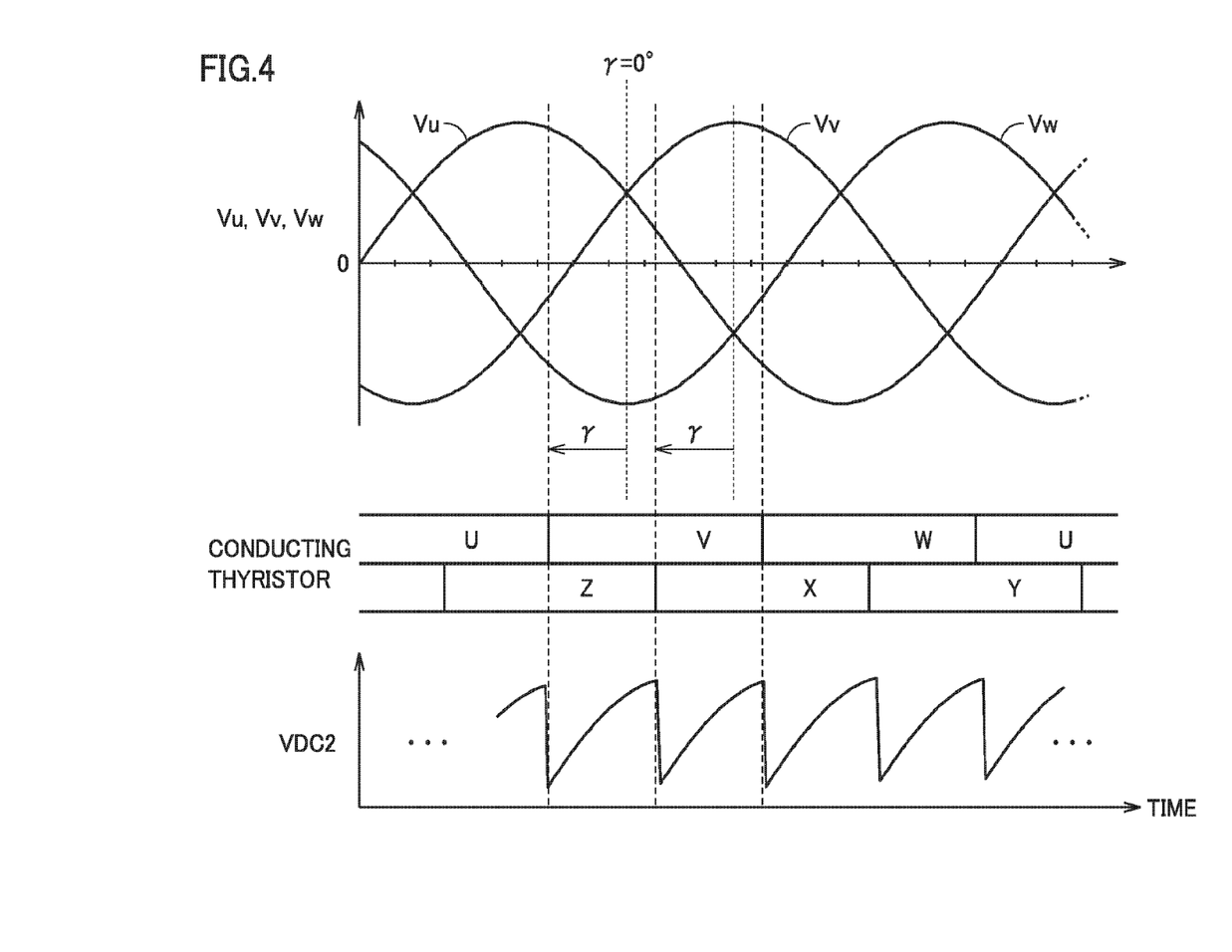
FIG. 4 is a time chart schematically showing an ideal commutation operation of the inverter in a load commutation mode.

FIG. 4 is a time chart schematically showing an ideal commutation operation of inverter 2 in the load commutation mode. FIG. 4 shows three-phase AC voltages Vu, Vv, and Vw, conducting thyristors of six thyristors U, V, W, X, Y, and Z of inverter 2, and DC voltage VDC2 appearing between input terminals 2a and 2b of inverter 2.

In FIG. 4, the point at which line voltages Vu-v, Vv-w, and Vw-u are 0 V is the reference point of phase control angle γ, and at the reference point, γ=0°. In the load commutation mode, a gate pulse is applied to the thyristors at a time ahead in phase by a desired angle γ from the reference point. For example, a gate pulse is applied to thyristor V during a period in which thyristor U is conducting, and then a gate pulse is applied to thyristor W during a period in which thyristor V is conducting. Similarly, a gate pulse is applied to thyristor X during a period in which thyristor Z is conducting, and then a gate pulse is applied to thyristor Y during a period in which thyristor X is conducting.

In response to transition of the conducting thyristor, line voltages Vu-v, Vv-w, and Vw-u of synchronous machine 20 sequentially appear as DC voltage VDC2 between input terminals 2a and 2b of inverter 2. Inverter controller 10 fires six thyristors U, V, W, X, Y, and Z two by two in order in response to rotation of synchronous machine 20 to control the path of current flowing through synchronous machine 20.

Figure 5:
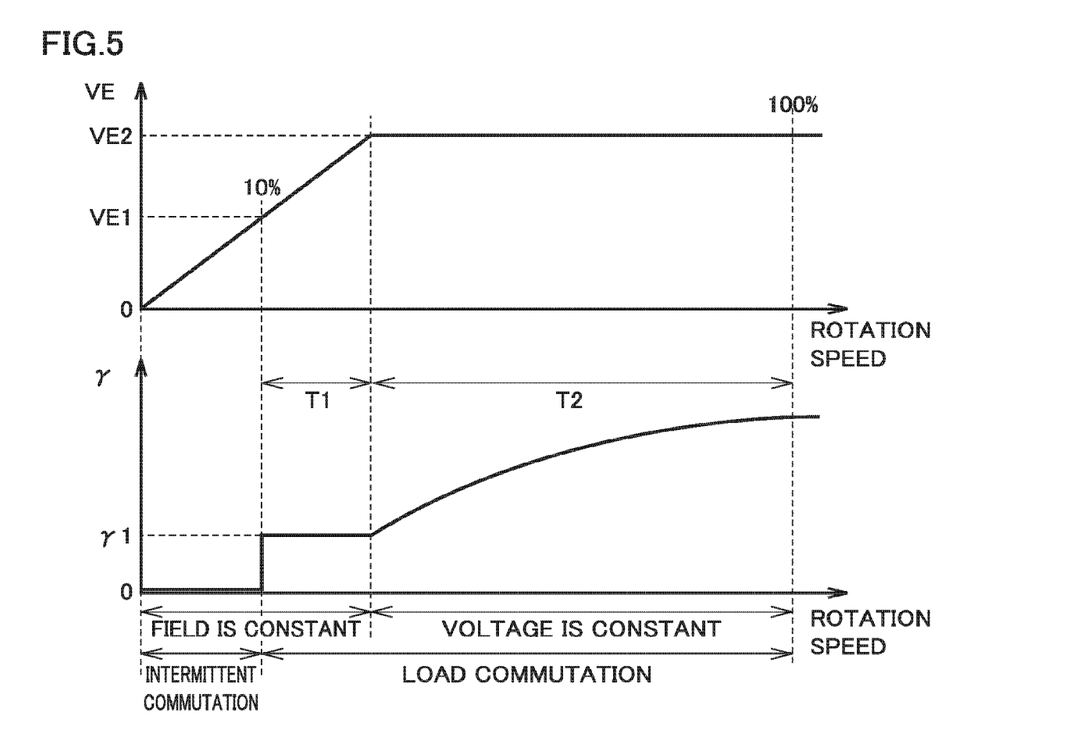
FIG. 5 is a diagram showing an example of the relation between a rotation speed of the synchronous machine shown in FIG. 1, and an effective value VE of induced voltage produced in the synchronous machine and a phase control angle γ.

FIG. 5 is a diagram showing an example of the relation between the rotation speed of synchronous machine 20 shown in FIG. 1, and effective value VE of the induced voltage produced in synchronous machine 20 and phase control angle γ.

Referring to FIG. 5, during acceleration of synchronous machine 20 from the stop state to the switching rotation speed (about 10% of the rated rotation speed), phase control angle γ is maintained at substantially zero. When the rotation speed of synchronous machine 20 arrives at the switching rotation speed and the intermittent commutation mode switches to the load commutation mode, phase control angle γ is set at γ1 (γ1>0).

As shown in FIG. 2, constant field current If is supplied to field winding 22 at this time, and thus, effective value VE of the induced voltage produced in synchronous machine 20 increases proportionally to the rotation speed of synchronous machine 20. During a time period from start of performance of the load commutation mode to arrival of effective value VE of the induced voltage at VE2 (corresponding to a time period T1 in the figure), phase control angle γ is maintained at constant value γ1.

As shown in FIG. 2, when effective value VE of the induced voltage arrives at VE2, field current If supplied to field winding 22 is decreased. Furthermore, during a time period from arrival of effective value VE of the induced voltage at VE2 to arrival of the rotation speed of synchronous machine 20 at the rated rotation speed (corresponding to a time period T2 in the figure), phase control angle γ is changed in accordance with the rotation speed. As a result, during time period T2, effective value VE of the induced voltage is kept at constant voltage VE2 even when the rotation speed changes.

Here, we discuss a case where a short-circuit failure occurs, in which the anode and the cathode are electrically short-circuited in any one of six thyristors U, V, W, X, Y, and Z of inverter 2 in the load commutation mode.

Figure 6:
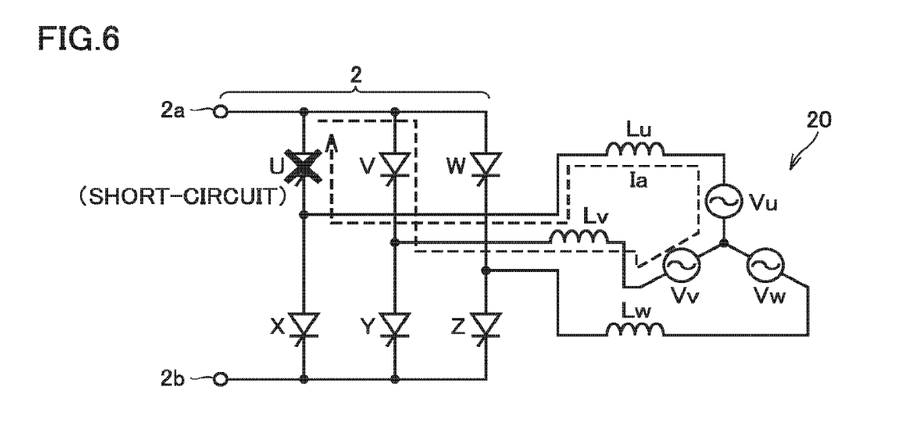
FIG. 6 is a circuit diagram for explaining a path of fault current.

For example, in a case where a short-circuit failure occurs in thyristor U, when a gate pulse is applied to thyristor V to make thyristor V conducting, a path of fault current Ia is formed so as to include thyristors V and U as shown in FIG. 6. Then, sound thyristor V and components such as armature windings may be damaged by fault current Ia. The larger fault current Ia is, the greater the damage on the components is, and it is more likely that the components are damaged.

Figure 7:
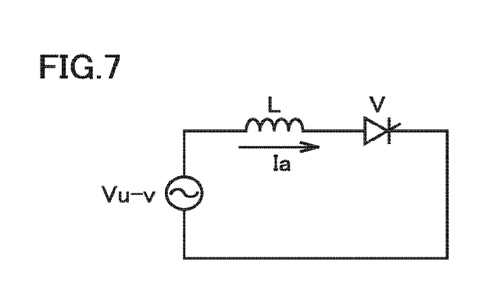
FIG. 7 is an equivalent circuit diagram schematically illustrating the path of fault current shown in FIG. 6.

The path of fault current Ia shown in FIG. 6 can be represented by an equivalent circuit diagram as shown in FIG. 7. In the equivalent circuit diagram in FIG. 7, the inductance of reactor L corresponds to the total value of inductances of armature windings ATU and ATV. AC power supply voltage corresponds to line voltage Vu-v of synchronous machine 20. It is assumed that the resistance component of each of armature windings ATU, ATV, and ATW is negligibly small.

When thyristor V is conducting, fault current Ia flows in thyristor V through reactor L. When the effective value of line voltage Vu-V is V, line voltage Vu-v is written as Equation (1) below.

$$Vu-v = \sqrt{2} V \sin \theta \tag{1}$$

Fault current Ia is current lagging behind line voltage Vu-v by 90° in phase. In the case of γ=π/2, fault current Ia is given by Equation (2) below, where L is the inductance of reactor L, and ω is the rotational angular velocity of synchronous machine 20.

$$Ia = \frac{\sqrt{2} V}{\omega L} \sin\theta \tag{2}$$

Figure 8:
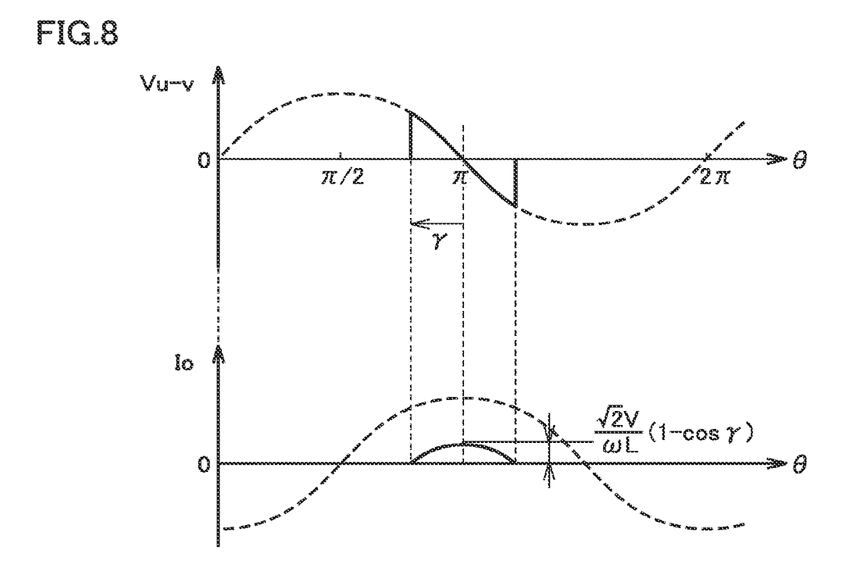
FIG. 8 is a diagram showing operation waveforms of line voltage and fault current.

FIG. 8 is an operation waveform of line voltage Vu-v and fault current Ia when π/2≤γ<π. The current waveform shown by a broken line in FIG. 8 indicates fault current Ia when γ=π/2.

Fault current Ia is a symmetrical waveform with respect to θ=π. The circuit equation in the thyristor V conducting period γ≤θ≤π+γ is given by Equation (3) below.

$$Vu - v = \sqrt{2} V \sin\theta = L \frac{dIa}{dt} \tag{3}$$

Solving Equation (3) with θ=ωt=π−γ and given a condition Ia=0 results in Equation (4) below. This current waveform is the same as the one obtained by removing the portion of π−γ≤θ≤π+γ from the current waveform of γ=π/2 (broken line).

$$Ia = -\frac{\sqrt{2} V}{\omega L}(\cos\theta + \cos\gamma) \tag{4}$$

Ia is largest when θ=π, and the maximum value is obtained by Equation (5) below.

$$Ia = \frac{\sqrt{2} V}{\omega L}(1 - \cos\gamma) \tag{5}$$

According to Equation (5), when line voltage Vu-v of synchronous machine 20 and the phase control angle γ are constant, fault current Ia is larger as rotational angular velocity ω of synchronous machine 20 is smaller (that is, as the rotation speed of synchronous machine 20 is lower). According to this, the magnitude of fault current Ia depends on the rotation speed of the synchronous machine at the timing when a short-circuit failure occurs in the thyristors of inverter 2. That is, the lower the rotation speed at that timing is, the larger fault current Ia is.

The conducting time of fault current Ia is represented by the rotation period of synchronous machine 20×2γ/2π. Therefore, the conducting time is inversely proportional to the rotation speed of synchronous machine 20. This indicates that the lower the rotation speed of synchronous machine 20 is, the longer the conducting time of fault current Ia is.

In this way, if a short-circuit failure occurs in any one of six thyristors U, V, W, X, Y, and Z of inverter 2 during the load commutation mode, fault current Ia flows through components of thyristor starter 100 and synchronous machine 20. The magnitude of fault current Ia is larger as the rotation speed of synchronous machine 20 is lower. In addition, the conducting time of fault current Ia is longer as the rotation speed of synchronous machine 20 is lower.

According to the time chart in FIG. 2, the timing when the rotation speed of synchronous machine 20 is lowest in the load commutation mode is the timing immediately after the intermittent commutation mode switches to the load commutation mode. As shown in FIG. 5, during time period T1 from start of performance of the load commutation mode to arrival of effective value VE of the induced voltage produced in synchronous machine 20 at VE2, phase control angle γ is maintained at constant value γ1. Therefore, during this time period T1, the conducting time of fault current Ia is inversely proportional to the rotation speed of synchronous machine 20 and is longer as the rotation speed is lower. Thus, if a short-circuit failure occurs during time period T1, the conducting time of fault current Ia is longer, leading to great damage to the components.

Then, in thyristor starter 100 according to the embodiment, phase control angle γ during time period T1 is changed in accordance with the rotation speed of synchronous machine 20.

Control of a firing phase of inverter 2 performed by thyristor starter 100 according to the embodiment will be described below with reference to FIG. 9.

Figure 9:
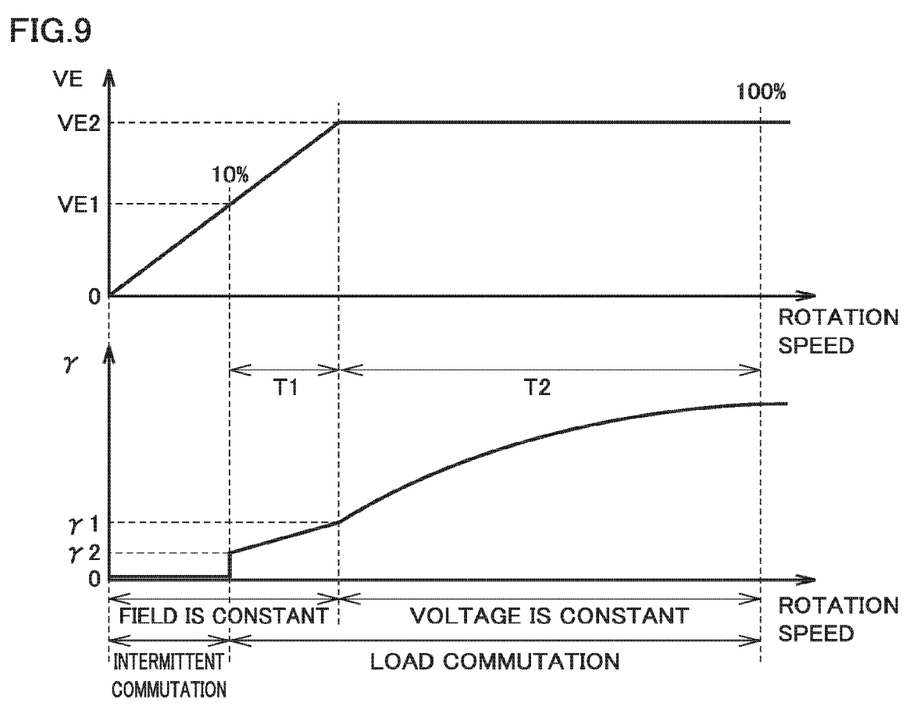
FIG. 9 is a diagram showing the relation between the rotation speed of the synchronous machine, and effective value VE of the induced voltage produced in the synchronous machine and phase control angle γ, in the thyristor starter according to the embodiment.

FIG. 9 is a diagram showing the relation between the rotation speed of synchronous machine 20, and effective value VE of the induced voltage produced in synchronous machine 20 and phase control angle γ, in thyristor starter 100 according to the embodiment, and is compared with FIG. 5. In FIG. 9, phase control angle γ shown in FIG. 5 is indicated by an alternate long and short dash line. Effective value VE of the induced voltage of synchronous machine 20 shown in FIG. 9 is equal to that shown in FIG. 5.

As shown in FIG. 9, when the intermittent commutation mode switches to the load commutation mode, phase control angle γ is changed during time period T1 such that a value thereof is larger as the rotation speed of synchronous machine 20 is higher. In the example in FIG. 9, phase control angle γ continuously changes within the range of γ2≤γ≤γ1 in accordance with the rotation speed of synchronous machine 20. However, phase control angle γ may discretely change in accordance with the rotation speed of synchronous machine 20. For example, phase control angle γ may change in a stepwise manner within the above-described range.

According to FIG. 9, the lower the rotation speed of synchronous machine 20 is, the smaller phase control angle γ is. Therefore, the conducting time of fault current Ia can be shorter as the rotation speed of synchronous machine 20 is lower. For example, if a short-circuit failure occurs at the timing immediately after switching to the load commutation mode is performed, the conducting time of fault current Ia is shortened by a factor of γ2/γ1.

Furthermore, by making phase control angle γ smaller, the magnitude of fault current Ia during time period T1 is also made smaller as compared with FIG. 5. For example, at the timing immediately after switching to the load commutation mode is performed, the magnitude of fault current Ia is shortened by a factor of (1−cos γ2)/(1−cos γ1). According to this, even if the rotation speed of synchronous machine 20 is low at the timing when a short-circuit failure occurs, the damage on the components by fault current Ia can be reduced.

The data indicating the relation shown in FIG. 9 can be stored in a memory within thyristor starter 100. By referring to the data, converter controller 13 can generate current command value Id* based on the calculated rotation speed of synchronous machine 20. The data may be in table format or in function format.

As described above, in the thyristor starter according to the embodiment of the present invention, by suppressing the increase in induced voltage produced in synchronous machine 20 in the intermittent commutation mode, the fault current at the timing immediately after the intermittent commutation mode switches to the load commutation mode can be reduced. As a result, the damage on the components of the thyristor starter and the synchronous machine by the fault current can be suppressed.

In the foregoing embodiment, synchronous machine 20 is a generator rotatably driven by a gas turbine in a thermal power plant. However, the embodiment is not limited thereto and synchronous machine 20 may be a synchronous machine for use in general industrial fields. For example, synchronous machine 20 may be a synchronous machine for a cooling blower in a steel plant.

The embodiment disclosed herein is illustrative and not limited to the description above. The scope of the present invention is defined by the claims, and it is intended that all modifications that come within meaning and range of equivalency of the claims are embraced.

REFERENCE SIGNS LIST 1 converter; 2 inverter; 3 DC reactor; 4, 5 current transformer; 6 voltage detector; 7 position detector; 9 current detector; 10 inverter controller; 11, 16 control angle calculator; 12, 17 gate pulse generator; 14 speed controller; 15 current controller; 20 synchronous machine; 21 exciter; 22 field winding; 24 rotor; 26 stator; 30 AC power supply; 100 thyristor starter; ATU, ATV, ATW armature winding; U, V, W, X, Y, Z thyristor; TR transformer.

The invention claimed is:

1. A thyristor starter that starts a synchronous machine, the thyristor starter comprising:
   a converter that converts AC power into DC power;
   a DC reactor that smoothes the DC power;
   an inverter that converts the DC power applied from the converter through the DC reactor into AC power with a variable frequency and supplies the AC power to the synchronous machine, and
   a controller that controls a firing phase of a thyristor in the inverter, wherein
   the thyristor starter accelerates the synchronous machine from a stop state to a predetermined rotation speed by sequentially performing a first mode and a second mode, the thyristor starter performing, in the first mode, commutation of the inverter by intermittently setting DC output current of the converter to zero, the thyristor starter performing, in the second mode, commutation of the inverter by induced voltage of the synchronous machine, and
   during a first time period from start of performance of the second mode to arrival of the induced voltage at a first voltage value, a phase control angle of the inverter is changed such that a value thereof becomes larger as a rotation speed of the synchronous machine becomes higher.

2. The thyristor starter according to claim 1, wherein
   the synchronous machine includes a rotor having a field winding, and a stator,
   the thyristor starter further comprising
   an exciter that supplies a field current to the field winding, wherein
   in the first and second modes, the thyristor starter increases the induced voltage proportionally to the rotation speed of the synchronous machine by maintaining the field current constant, and
   after the induced voltage arrives at the first voltage value in the second mode, the thyristor starter keeps the induced voltage at the first voltage value by decreasing the field current in accordance with the rotation speed of the synchronous machine.

3. The thyristor starter according to claim 1, wherein
   during the first time period, the phase control angle continuously changes in accordance with the rotation speed of the synchronous machine.

4. The thyristor starter according to claim 1, wherein
   during the first time period, the phase control angle discretely changes in accordance with the rotation speed of the synchronous machine.

5. The thyristor starter according to claim 1, wherein
   during a second time period from arrival of the induced voltage at the first voltage value to arrival of the synchronous machine at the predetermined rotation speed, the phase control angle is changed in accordance with the rotation speed of the synchronous machine so as to keep the induced voltage at the first voltage value.

6. The thyristor starter according to claim 1, further comprising
   a position detector that detects a rotor position of the synchronous machine, wherein the controller calculates the rotation speed of the synchronous machine based on a detection signal of the position detector, and sets the phase control angle based on the calculated rotation speed of the synchronous machine.

* * * * *